United States Patent [19]

Holtzman

[11] 4,002,947
[45] Jan. 11, 1977

[54] ARCING STACKED PLATE NONLINEAR RESISTOR FOR VOLTAGE LIMITER APPLICATIONS SUCH AS SERIES CAPACITOR PROTECTION

[75] Inventor: Barry L. Holtzman, Bloomington, Ind.

[73] Assignee: Westighouse Electric Corporation, Pittsburgh, Pa.

[22] Filed: June 10, 1975

[21] Appl. No.: 585,728

[52] U.S. Cl. .............................. 317/12 A; 317/16
[51] Int. Cl.² .......................................... H02H 7/16
[58] Field of Search ............. 317/11 C, 12 R, 12 A, 317/12 B, 16, 31; 323/95; 338/20, 21, 101, 106, 109

[56] References Cited
UNITED STATES PATENTS
2,870,307   1/1959   Milliken et al. ..................... 338/21

FOREIGN PATENTS OR APPLICATIONS
2,003,949   11/1970   Germany ......................... 317/12 A Primary Examiner—Harry Moose
Attorney, Agent, or Firm—G. H. Telfer

[57] ABSTRACT

A stack of loosely touching resistive or conductive plates, such as a carbon pile, with a characteristic arc discharge voltage applied to limit voltage, enabling the lowering of protection levels of bypass spark gaps in protection systems for series capacitors and to increase the benefit of the series capacitor by not requiring it to be removed from the line during brief overvoltages.

8 Claims, 4 Drawing Figures

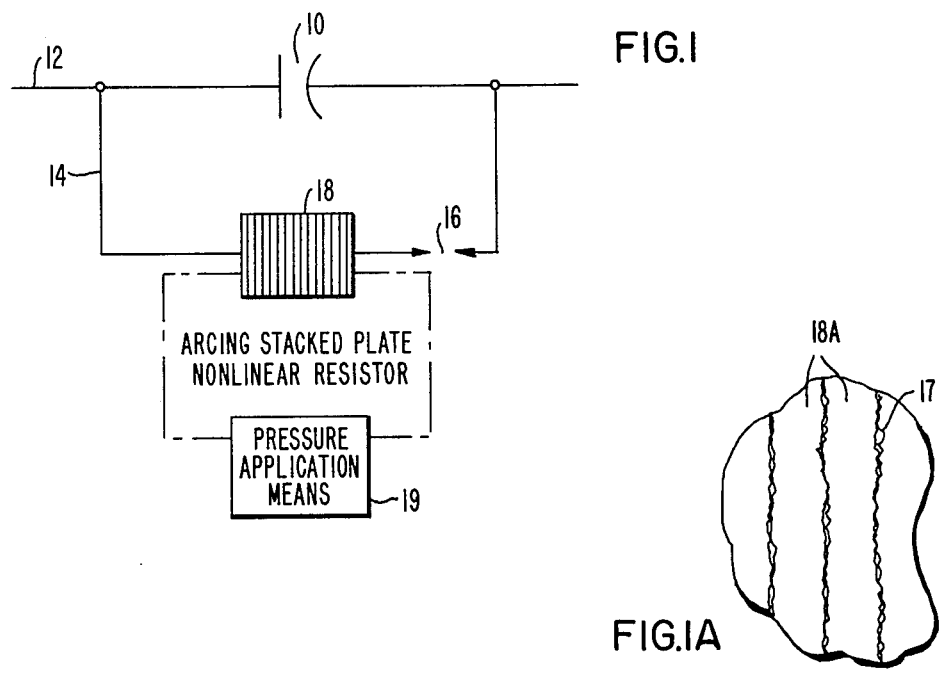
FIG.1
FIG.1A
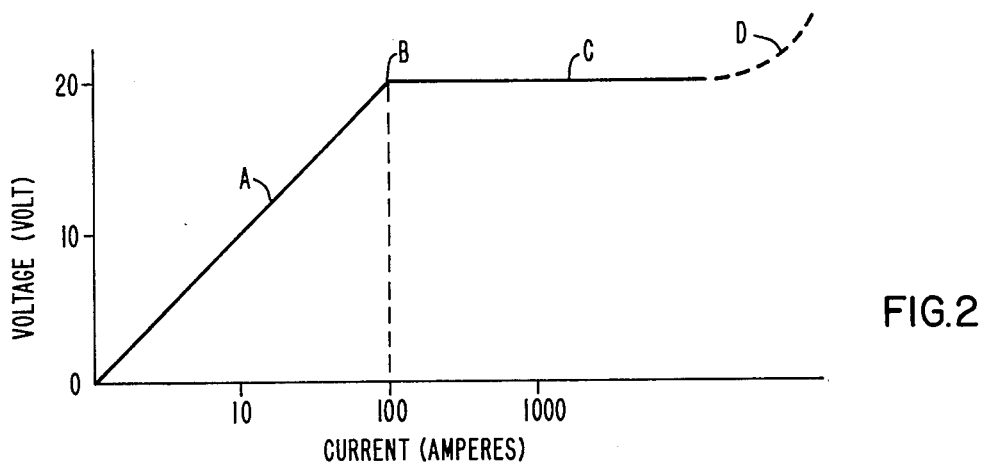
FIG.2
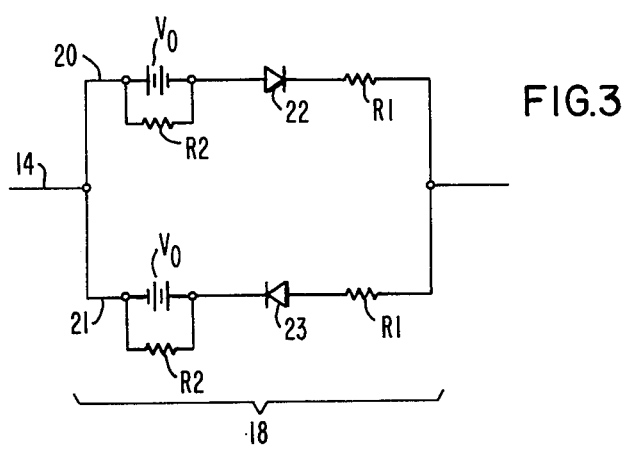
FIG.3

ARCING STACKED PLATE NONLINEAR RESISTOR FOR VOLTAGE LIMITER APPLICATIONS SUCH AS SERIES CAPACITOR PROTECTION

BACKGROUND OF THE INVENTION

The invention relates generally to overvoltage protection equipment for electrical apparatus and particularly to protection equipment for series capacitor installations for high voltage alternating current transmission lines.

Capacitor banks are connected in series in high voltage transmission lines to compensate a desired part of the inductance of the line in order to stabilize the system, control load division between parallel lines, or provide other benefits. Since the capacitors are in series in the line they are subject to dangerous overvoltages in case of a fault on the line or other excess current conditions such as may result from switching surges.

A substantial body of technology has developed for the purpose of protecting series capacitor banks against harmful faults. Normally the general nature of the protection system is to provide a bypass around the capacitor bank, such as by breakdown of a parallel spark gap, when a harmful condition occurs. This of course means that during the period of time the capacitor is being bypassed by a direct conductive path, it is not contributing capacitance to the system and the intended benefits of the capacitor installation are not provided. Consequently, it is very desirable that the protective equipment be sufficient to protect the capacitors against conditions that would damage them but that any over protection be minimized by not completely removing the series capacitor during brief overvoltages. If the bypass equipment operates on such a transient, the problem then becomes how to restore the capacitor to the transmission line quickly and efficiently. This can be a difficult problem because transients normally occurring immediately upon reinsertion of the capacitor in the transmission line would result in danger of repeated operation of the bypass equipment.

This background on problems of series capacitor protection equipment and their solution is further discussed in commonly assigned copending application Ser. No. 500,996, filed Aug. 27, 1974 by C. A. Peterson, now U.S. Pat. No. 3,889,158, issued June 10, 1975, and Grove et al U.S. Pat. No. 3,801,870, issued Apr. 2, 1974, and the additional patents referred to therein.

Among electrical components are those known as nonlinear resistors that exhibit a distinct change in resistance magnitude upon occurrence of certain conditions. A familiar type is that referred to as a carbon pile that comprises a plurality of carbon plates stacked in sequence in an operating circuit with provision for varying the contact pressure between the plates. The amount of resistance exhibited by the carbon pile decreases as the pressure increases because of improvement of the interface contact. Certain forms of such devices are arranged so that upon occurrence of a predetermined current flow through the carbon pile there is an abrupt release of pressure on the plates with the result that there is an abrupt increase in resistance serving to limit the current through the pile to a predetermined value. The abrupt increase in resistance in some applications is intended to be sufficiently high that the pile acts as a switch opening the circuit. For background on such devices reference is made to Whittaker U.S. Pat. No. 2,406,449, Aug. 27, 1946, and Hicks et al U.S. Pat. No. 3,764,851, Oct. 9, 1973. Such pressure dependent current limiting devices are subject to variation in performance with continued use because of wear caused either mechanically or by electrical discharges at the interfaces.

Another known type of carbon pile device that has been applied in practice is that sometimes referred to as an "auto valve" arrester for electrical surge suppression such as in lightning arresters. In this device the plates, such as of carbon, are spaced a small distance, such as 4 or 5 mils, by insulating spacers. Such carbon piles with intermediate spacing exhibit a relatively high characteristic voltage such as about 350 volts at which breakdown by glow discharge occurs with relatively low current conduction capability.

It has been previously recognized, such as in the work relating to the current limiting device of abovementioned U.S. Pat. No. 3,764,851, that even in direct contact carbon piles the extent to which arcing occurs and the nature of that arcing influences the characteristics of the device. It has been recognized, for example, that where the surfaces are sufficiently rough and the applied pressure is such that the plate contact is limited to a number of spaced points or areas that an arc discharge occurs, as opposed to a glow discharge, in which state the voltage across the pile is limited to a characteristic value but the range of current that can be conducted in that state is wide. For example, under these conditions a typical pile may exhibit a "short arc voltage" of approximately 20 volts over a current range of from about 100 amperes to thousands of amperes.

SUMMARY OF THE INVENTION

The present invention came about from recognition of the suitability of the properties of an arcing carbon pile device to the protection of series capacitors and similar apparatus. A stack of loosely touching resistive or conductive plates, such as a carbon pile, with surfaces of such a nature as to cause arcing at a desired voltage, is applied to limit voltage, particularly for avoiding the effects of transients on the series capacitor. In general, the invention provides a way for a series capacitor to be made less subject to transient overvoltages by having in parallel with it an arcing nonlinear resistor during the overvoltage condition.

The desired characteristic arcing voltage is achieved by selection of the composition, number and surface texture of the plates and maintaining on them a suitable pressure consistently. In this way the arcing voltage limiter can be made with the desired characteristics for a particular application and can perform repeatedly with a consistent arcing voltage.

THE DRAWINGS

FIG. 1 is a circuit schematic of the basis combination of the invention;

FIG. 1A is a partial sectional view of a nonlinear resistor in accordance with an embodiment of the present invention.

FIG. 2 is a current-voltage characteristic curve of an arcing nonlinear resistor employed as a voltage limiter in the present invention, and FIG. 3 is a circuit schematic of the equivalent circuit of an arcing nonlinear resistor employed as a voltage limiter in the present invention.

DESCRIPTION OF PREFERRED EMBODIMENTS

Referring to FIG. 1, there are shown the basic elements of a series capacitor installation incorporating the present invention. A capacitor 10 is connected in series in a high voltage alternating current transmission line 12. It will be understood that the illustrative capacitor 10 can represent a high voltage capacitor bank usually consisting of many individual capacitor units connected in a suitable series-parallel arrangement to obtain the desired capacitive reactance and current capacity. Such banks are frequently divided into a number of series connected segments and the illustrated capacitor is intended to represent such an installation. The term "capacitor" as used herein therefore includes capacitor banks having any number of suitably connected individual capacitor units as well as an individual unit.

It will also be understood that the illustration applies to only one phase of what is usually a three phase transmission line installation with similar capacitors and protective equipment on each phase. Additionally, it will be understood that for a particular phase the apparatus as shown may be accompanied by a duplicate in accordance with known practice. Reference is made to the copending application and issued patent referred to in the background portion of this specification and to the additional patents referenced therein for further information relevant to the completion to a series capacitor installation that may incorporate the present invention. Further information on an overall series capacitor installation is in CIGRE Paper No. 31–06. The descriptions of such background art are herein incorporated by reference.

The capacitor is shown with a single circuit branch connected in parallel across it that is the main bypass circuit branch of the protection system. It will be understood that there may in accordance with known art, mentioned above and incorporated by reference herein, be additional parallel connected branches, for example, one additional branch may contain a trigger gap more sensitive than the main bypass circuit branch for expediting the buildup of voltage across the main bypass branch upon occurence of fault conditions. In accordance with copending application Ser. No. 500,996, previously referred to, there may be a plurality of trigger gap branches and they may be applied in combination with the present invention. Additionally, another bypass circuit branch may be provided such as one that contains a mechanical bypass which would be to provide a means for inspection or maintenance of the capacitor.

The main bypass branch 14 is responsive to certain overvoltage conditions to result in a bypass around the series capacitor for its protection and includes a main bypass spark gap 16 in accordance with past practices. Spark gap 16 may have an air blast arc extinction means, not shown.

The main bypass spark gap 16 has in series with it a nonlinear resistor 18 of the arcing type. FIG. 1A shows a partial enlarged view of the resistor 18. The nonlinear resistor comprises a plurality of stacked plates 18A of material, such as principally of carbon although other materials may be used, that are held in direct contact under pressure by clamps or other suitable mechanical means 19. The plates 18A have sufficient surface roughness to provide isolated points or areas 17 of direct contact so as to cause arcing to occur between the plates when a desired voltage is applied.

A particular form of the nonlinear resistor 18 that is suitable may be one generally in accordance with the structure disclosed in the above mentioned U.S. Pat. No. 3,764,581. However, in contrast with the device of that patent the plates 18A of the device 18 of the present invention are to be held under consistent pressure throughout operation rather than to be displaced upon occurrence of a given current conduction. While the prior device of U.S. Pat. NO. 3,764,851 employs an arcing carbon pile it is intended for current limiting applications whereas in the present invention high current conduction capability with voltage limiting action is the nature of the performance desired. Additional information on such carbon piles of a general nature that may be employed in the present invention may be found by reference to application Ser. No. 281,684, Aug. 18, 1972 by Paice et al and assigned to the present assignee, which application is now abandoned.

For example, a stack of plates of carbon (Stackpole Carbon Co. Grade 6077) of which some or all have rough sawed surfaces which on a roughness scale have a surface roughness of about 250 microinches are suitable for use in the nonlinear resistor. Such plates, mentioned merely by way of example, may have a thickness of approximately 3/16 inch each and are stacked in a sufficient number to provide a characteristic voltage limit as desired. The voltage limit of the nonlinear resistor 18 may be approximately equal to or slightly greater than the characteristic sparkover voltage of the main spark gap 16 but may be selected at any desired level in accordance with overall performance requirements of the system.

FIG. 2 illustrates a typical characteristic curve for an arcing nonlinear resistor 18 employed in the present invention. As shown in the characteristic curve there is gradually increasing current conduction in region A over a range from zero up to the point (B) at which the characteristic voltage limit of the device is reached. Then in region C the characteristic changes so that without any appreciable change in voltage drop the current may increase substantially over at least an order of magnitude and preferably several orders of magnitude. The ultimate limit on the current carrying capabilities of a particular arcing nonlinear resistor is believed likely to occur when sparking occurs at such a rate that the products of sparking cannot be readily removed from the structure so that there will eventually be some upturn in the characteristic (region D) illustrating an increased resistance. The structure of the nonlinear resistor of the mentioned U.S. Pat. No. 3,764,851 is one that includes arc chutes for facilitating the removal of arcing products from the pile, which is desirable for high current conduction.

The nonlinear resistor 18 employed here, unlike that referred to in the introduction as having been previously used in lightning arrestors, does not employ insulating spacers between individual plates or any other means of complete separation. Rather in devices appropriate to this invention the plates are intended to be in contact. The area of contact is determined by disc size, surface texture, and pressure. The contact resistance is determined by the contact area and material resistivity. It is appropriate that the current at which arcing between the plates begins is low, such as in the range of from about 10 to 100 amperes, at a relatively low voltage, such as in the range of 10 to 50 volts, for devices suitable for series capacitor equipment. Sparking at the current desired can be achieved by appropriate selection of the contact resistance that can be determined empirically by varying the disc cross sectional dimensions, the surface roughness, the pressure applied on the stack of plates, and the resistivity of the plates themselves, and the number of interfaces determines voltage. All of these parameters can be selected in accordance with the desired electrical performance as well as appropriate mechanical considerations.

What is believed to occur in operation is that at low currents, such as under 100 amperes in the example of the device having a characteristic curve as shown in FIG. 2, the voltage across the nonlinear resistor 18 is too low to cause arcing and the resistance of the pile is determined by the sum of the individual contact resistances and the through resistance of the material. As the current is increased, hot spots develop at the points or areas of contact. This is caused by the high current density at these points or areas. The resulting increase in temperature causes the contact points to burn away and arcing begins. The arcing continues with an arc voltage that is fairly stable, such as 20 volts in the example, and will continue until for any reason the current is too small to sustain the arc. In a series capacitor situation this would be expected to occur when the fault is cleared from the transmission line.

As previously stated, the main spark gap 16 of FIG. 1 may be chosen to have a gap setting approximately equal or slightly greater than the characteristic voltage limit of the pile 18 so that at this level the gap sparks over and is also capable of substantial current conduction. In general it is preferred for the spark gap breakdown voltage to be of the same magnitude (+ or − 10%) as the characteristic voltage of the nonlinear resistor. Matched characteristics are desirable for more economical design of the capacitor and its related fuse (not shown).

When the capacitor voltage exceeds the voltage setting of the gap, the capacitor is paralleled by the bypass circuit branch 14. The pile acts as a valve bypassing any current around the capacitor and through the spark gap which would cause the capacitor voltage to exceed the pile characteristic voltage. Therefore, in the practice of this invention the series capacitor is never completely removed from the line during fault conditions, as is the case in prior systems.

FIG. 3 shows an equivalent circuit for the pile's operation, after the spark gap has sparked over, and assuming an alternating voltage on the line so the equivalent circuit includes two branches 20 and 21 with oppositely poled diodes 22 and 23, respectively. The opposite poled voltages, $V_o$, are equal to the pile characteristic voltage. $R_1$ in each branch is used to represent any increase above the characteristic voltage and is intended to be designed to be negligible. The combined values of R1 + R2 represent the overall resistance through the carbon pile below the arcing voltage.

The use of the nonlinear resistor 18 allows lower spark gap settings, that is a main gap can be selected to spark over at a lower value than previously and this reduces the cost of related components including capacitors, fuses, racks, platforms, and control equipment.

While the application of immediate interest of this invention is that in which the arcing nonlinear resistor 18 is applied in series with an additional voltage responsive element such as the main spark gap 16 for protection of series capacitors 10, the invention additionally has somewhat greater general aspects. It is of course the case that the protected equipment may not necessarily be a series capacitor but could by any electrical element requiring overvoltage protection. It is also the case that the bypass element may be some voltage responsive device other than a spark gap as normally used in series capacitor protection. A semiconductor switching device of suitable power handling capability could be used as such a voltage responsive device. Additionally, the voltage limiting nonlinear resistor can in some applications be used by itself without the additional series spark gap as a voltage limiting element across the equipment to be protected.

It is therefore believed that the present invention provides a unique combination of elements employing an arcing nonlinear resistor that results in considerable utility in electrical equipment overvoltage protection.

I claim:

1. A series capacitor installation having a capacitor adapted to be connected in series in an alternating current transmission line, a circuit branch in parallel with said capacitor containing a spark gap device responsive to a predetermined voltage level for bypassing said capacitor under predetermined conditions and a nonlinear resistor connected in series with said spark gap device and characterized by exhibiting increasing voltage drop with increasing current up to a predetermined voltage level at which the current can increase further at least an order of magnitude without appreciable increase in voltage drop.

2. A series capacitor installation as in claim 1 wherein said nonlinear resistor comprises a plurality of adjacent plates held together in contact and exhibiting, at a predetermined current level flowing through said resistor, arcing therebetween that results in increasing current conduction capability without appreciably increasing voltage.

3. A series capacitor installation as in claim 2 wherein said adjacent plates of said nonlinear resistor comprise carbon as a principal constituent.

4. A series capacitor installation as in claim 3 wherein said adjacent plates have surfaces in contact with each other that have a predetermined surface roughness to achieve arcing at said predetermined current level.

5. A series capacitor installation as in claim 3 wherein means for applying pressure to said plates is provided to maintain substantially consistent contact therebetween.

6. A series capacitor installation as in claim 1 wherein said spark gap is responsive to a voltage that is equal to or within 10% of said predetermined voltage level of said nonlinear resistor.

7. A series capacitor installation comprising: a capacitor for connection in an alternating current transmission line; a bypass circuit branch connected in parallel across said capacitor, said bypass circuit branch including an arcing stacked plate nonlinear resistor.

8. A series capacitor installation in accordance with claim 7 wherein: said bypass circuit branch also includes a spark gap device in series with said nonlinear resistor; said nonlinear resistor having a characteristic arcing voltage at which high current conduction occurs; said spark gap device having a characteristic breakdown voltage at which high current conduction occurs, said latter voltage being approximately equal to said former voltage.

* * * * *